(12) United States Patent
Cooreman

(10) Patent No.: US 12,034,831 B2
(45) Date of Patent: Jul. 9, 2024

(54) HARDWARE COUNTERMEASURES AGAINST DFA ATTACKS ON AES OPERATIONS

(71) Applicant: Silicon Laboratories Inc., Austin, TX (US)

(72) Inventor: Steven Cooreman, Nittedal (NO)

(73) Assignee: Silicon Laboratories Inc., Austin, TX (US)

( * ) Notice: Subject to any disclaimer, the term of this patent is extended or adjusted under 35 U.S.C. 154(b) by 241 days.

(21) Appl. No.: 17/844,817

(22) Filed: Jun. 21, 2022

(65) Prior Publication Data

US 2023/0412356 A1 Dec. 21, 2023

(51) Int. Cl.
*H04L 9/00* (2022.01)
*H04L 9/06* (2006.01)

(52) U.S. Cl.
CPC ............ *H04L 9/004* (2013.01); *H04L 9/0631* (2013.01); *H04L 2209/12* (2013.01)

(58) Field of Classification Search
CPC .......................... H04L 9/0631; H04L 2209/12
See application file for complete search history.

(56) References Cited

U.S. PATENT DOCUMENTS

| 8,781,114 | B2* | 7/2014 | Gammel | ................. | H04L 9/004 380/43 |
| 10,020,932 | B2* | 7/2018 | Michiels | ................. | H04L 9/004 |
| 11,449,606 | B1* | 9/2022 | Satpathy | ............ | G02B 27/0172 |
| 11,768,987 | B2* | 9/2023 | Jain | ........................... | G06F 7/58 703/14 |
| 2006/0104438 | A1* | 5/2006 | Giraud | .................... | H04L 9/004 380/28 |
| 2007/0189536 | A1* | 8/2007 | Gammel | ................. | H04L 9/004 380/259 |
| 2016/0072621 | A1* | 3/2016 | Oshida | .................. | G06F 21/554 713/194 |
| 2018/0069694 | A1* | 3/2018 | Riou | ....................... | G06F 21/14 |
| 2018/0331820 | A1* | 11/2018 | Rietman | ............. | H01L 23/5386 |

(Continued)

OTHER PUBLICATIONS

Giraud, DFA on AES, 2005, 15 pages (Year: 2005).*

(Continued)

*Primary Examiner* — Hieu T Hoang
(74) *Attorney, Agent, or Firm* — NIELDS, LEMACK & FRAME, LLC

(57) ABSTRACT

A system and method of performing an AES encryption, while also determining whether a potentially successful DFA attack is underway is disclosed. When interim results are not visible, the DFA attack that is most likely to be succeed is initiated by introducing the fault between the MixColumns operation in the second to last round and the MixColumns operation in the next to last round. To detect this, the present system and method performs the next to last round and then repeats this next to last round. The results of the original round and repeated round are compared to identify a possible DFA attack. Importantly, the same hardware is used for the original round and the repeated round. In this way, the amount of additional hardware needed to detect a possibly successful DFA attack is minimized. Further, the impact on execution time may be 10% or less.

20 Claims, 10 Drawing Sheets

(56) References Cited

U.S. PATENT DOCUMENTS

2021/0117575 A1* 4/2021 Weiner .................. G06F 21/556
2023/0216677 A1* 7/2023 Wu .......................... H04L 9/32
                                                                713/168

OTHER PUBLICATIONS

Chen et al., "Differential Fault Analysis on AES Key Schedule and Some Countermeasures", Australasian Conference on Information Security and Privacy, pp. 118-129, 2003.
Teuwen et al., "Differential Fault Analysis on White-box AES Implementations", Dec. 19, 2016, <https://blog.quarkslab.com/differential-fault-analysis-on-white-box-aes-implementations.html>.

* cited by examiner

HARDWARE COUNTERMEASURES AGAINST DFA ATTACKS ON AES OPERATIONS

FIELD

This disclosure describes systems for protecting against differential fault analysis (DFA) attacks in semiconductor devices that contain AES (Advanced Encryption Standard) hardware.

BACKGROUND

Many semiconductor devices include AES hardware to enable encryption and decryption operations. The AES hardware performs a sequence of operations, referred to as a round, and repeats this sequence a plurality of times.

It has been discovered that a fault injected during a specific interval in the operation of the algorithm may provide information that may allow a bad actor to determine the initialization vector key.

The AES algorithm operates as follows. There are a plurality of rounds; 10 rounds for AES-128, 12 rounds for AES-192 and 14 rounds for AES-256. In each round, a sequence of operations is performed. FIG. 1 shows the operations performed in each round, except the last round. Each operation may be performed by a circuit, the descriptions of which are provided below. Thus, the terms "circuit", "operation" and "function" may be used interchangeably throughput this disclosure.

As shown in FIG. 1, each round circuit 10 receives an input typically from the previous round and generates an output 30, which is provided as the input to the subsequent round. The input for the first round circuit is the plaintext data to be encrypted. The input 20 typically comprises 16 bytes, which are arranged as a 4×4 array.

The input 20 is then processed by a SubBytes circuit 11. The SubBytes circuit 11 replaces each byte in the input 20 with a different byte, which is determined based on a lookup table. Thus, the SubBytes operation substitutes each byte with another byte. The output of the SubBytes circuit 11 then enters the ShiftRows circuit 12.

The ShiftRows circuit 12 (i.e. the ShiftRows operation) is used to shift the rows of the 4×4 array. For example, the first row of the 4×4 array is left intact, while the second row is shifted cyclically one place to the left. The third row is shifted cyclically two places to the left. The fourth row is shifted cyclically three places to the left. The output from the ShiftRows circuit 12 then enters the MixColumns circuit 13.

It is noted that the SubBytes circuit 11 and the ShiftRows circuit 12 may be executed in the opposite order, where the ShiftRows is performed before the SubBytes operation, without affecting the output. In both embodiments, the SubBytes circuit 11 and the ShiftRows circuit 12 are executed sequentially and before the MixColumns circuit 13.

The MixColumns circuit 13 performs a matrix multiplication of each column of the incoming array. Specifically, the MixColumns circuit 13 performs the following operation:

$$\begin{bmatrix} \text{Output}(0,j) \\ \text{Output}(1,j) \\ \text{Output}(2,j) \\ \text{Output}(3,j) \end{bmatrix} = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \begin{bmatrix} \text{Input}(0,j) \\ \text{Input}(1,j) \\ \text{Input}(2,j) \\ \text{Input}(3,j) \end{bmatrix} \text{ for } 0 \le j \le 3$$

Thus, the MixColumns operation preforms a matrix multiplication on each column of the array. The output from the MixColumns circuit 13 is used as an input to the adder 14. The adder 14, also referred to as the adder operation, is used to exclusive or (XOR) a byte of the round key 15 with a respective byte from the 4×4 array which was output from the MixColumns circuit 13. The output from the adder 14 is the output 30, which is also a 4×4 array.

The round keys 15 are generated from the initial vector according to a predetermined schedule.

As noted above, the final round circuit is slightly different from the other rounds. FIG. 2 shows the operations performed in the last round. The final round circuit 50 is similar to the round circuit 10 shown in FIG. 1, but does not include the MixColumns circuit 13. The rest of the final round circuit 50 is the same as that described above. As noted above, the SubBytes operation and the ShiftRows operation may be executed in the opposite order without affecting the output.

In certain embodiments, the AES hardware may include a plurality of round circuits 10 and a final round circuit 50, as shown in FIG. 3. Plaintext, typically 128 bits, is provided as an input to the first round circuit. An initialization vector is also provided, which is used to generate all of the round kays. After the operation of the AES hardware is completed, the output is 128 bits of encrypted data.

FIG. 3 shows an embodiment where the circuitry used for the round circuits 10 is duplicated for each round. This results in either 9, 11 or 13 round circuits 10 and one additional final round circuit 50. This may be very gate intensive and require a large amount of real estate and power. Consequential, to reduce the amount of real estate, in certain embodiments, the round circuit shown in FIG. 1 is used to perform all of the rounds sequentially. FIG. 4 shows one example of circuitry that may be used to provide this functionality.

In FIG. 4, the circuit shown in FIG. 1 has been modified to create an integrated round circuit 60 which addresses three unique aspects of FIG. 3. Specifically, in all rounds, except the first round, the input to each round 10 is the output from the previous round 10. Second, each round is provided with a different round key 15. Finally, the final round 50 does not include the MixColumns circuit 13.

These three issues are addressed through the inclusion of three multiplexers. A controller 65 is used to count the number of rounds that are being performed. In the case of AES-128, there are rounds; AES-192 has 12 rounds and AES-256 has 14 rounds.

Input multiplexer 61 is used to select between the incoming plaintext data and the current output from the integrated round circuit 60. When the controller 65 indicates that this is the first round, the input multiplexer 61 selects the plaintext data. If this is not the first round, the output from the integrated round circuit 60 is selected.

Adder multiplexer 62 is used to select the input to the adder 14. As described above, in all rounds, except the final round, there is a MixColumns circuit 13. However, in the final round, this circuit is omitted. Thus, the adder multiplexer selects the output of the MixColumns circuit 13 for all rounds except the final round. In the final round, the adder multiplexer selects the output from the ShiftRows circuit 12. Thus, the adder multiplexer 62 is used to bypass the MixColumns circuit 13 in the final round.

Key multiplexer 63 is used to select the appropriate round key to supply to the adder 14, depending on the round being performed. Thus, the key multiplexer has N inputs, where N is the number of rounds, and has one output, which is the round key to be used by the integrated round circuit 60 at that time.

Note that the SubBytes circuit 11 and the ShiftRows circuit 12 may be arranged in the opposite order so that the output from the ShiftRows circuit 12 provides the input to the SubBytes circuit 11. Further, these two circuits are performed prior to the MixColumns circuit 13, which is performed prior to the adder 14.

Having described the architecture of the AES circuitry, the vulnerability will be described. In certain embodiments, if a fault is inserted between the second from last MixColumns 13 (i.e. in round N−2) and the last MixColumns circuit 13 (i.e. in round N−1), it may be possible to determine the initialization vector key. Specifically, a fault introduced at this time will result in four bytes of the output encrypted data being affected. Because the faulted output encrypted data only differs in some bytes from the unfaulted output encrypted data, it is more easily detectable that a fault was injected successfully, resulting in easier determination of the initialization vector key.

To address this, it has been proposed to duplicate the AES circuitry (either that shown in FIG. 3 or in FIG. 4) and comparing the outputs from the two AES circuits. Obviously, this approach requires the inclusion of a large number of redundant circuitry, which adds real estate and consumes more power. Another approach is to perform the AES operation at twice the normal frequency using both edges of the clock. While this does not cost much in term of real estate, it does consume power. Another approach is to perform the AES operation twice using the same hardware (either that shown in FIG. 3 or FIG. 4). This approach requires buffers to store the results and also consumes more power since the AES circuit is operating twice as frequently.

Obviously, none of these approaches is ideal. Therefore, it would be beneficial if there was a system and method to ensure that the vulnerability of the AES algorithm was not exposed which did not require a large amount of additional circuitry and did not slow performance significantly.

SUMMARY

A system and method of performing an AES encryption, while also determining whether a potentially successful DFA attack is underway is disclosed. When interim results are not visible, the DFA attack that is most likely to succeed is initiated by introducing the fault between the MixColumns operation in the second to last round and the MixColumns operation in the next to last round. To detect this, the present system and method performs the next to last round and then repeats this next to last round. The results of the original round and repeated round are compared to identify a possible DFA attack. Importantly, the same hardware is used for the original round and the repeated round. In this way, the amount of additional hardware needed to detect a possibly successful DFA attack is minimized. Further, the impact on execution time may be 10% or less.

According to one embodiment, a method for detecting a Differential Fault Analysis (DFA) attack when executing an AES algorithm is disclosed. The AES algorithm comprises execution of N rounds, each of a first (N−1) rounds comprising a SubBytes operation, a ShiftRows operation, a MixColumns operation and an adder operation, and wherein a last round comprises the SubBytes operation, the ShiftRows operation and the adder operation. The method comprises providing plaintext data to the AES algorithm; performing a first (N−2) rounds; saving interim data after completion of the MixColumns operation in the $(N-2)^{nd}$ round; performing at least a portion of a $(N-1)^{st}$ round; saving results after completion of the MixColumns operation in the $(N-1)^{st}$ round; repeating a portion of the AES algorithm using the interim data, using a same circuit as was used to perform the at least a portion of the $(N-1)^{st}$ round, wherein the portion of the AES algorithm that is repeated comprises all operations starting after the interim data was saved and ending with the operation after which the results were stored; comparing an output of the repeated portion of the AES algorithm with the saved results; and flagging an error if the output of the repeated portion of the AES algorithm and the saved results do not match. In some embodiments, the interim data is saved after a last operation in which an injected fault would result in all bytes of the output being affected. In some embodiments, the interim data is saved after the MixColumns operation and before the adder operation of the $(N-2)^{nd}$ round. In some embodiments, the interim data is saved after the adder operation of the $(N-2)^{nd}$ round and before the SubBytes operation of the $(N-1)^{st}$ round. In some embodiments, the results saved after the MixColumns operation and before the adder operation of the $(N-1)^{st}$ round. In some embodiments, the results are saved after the adder operation of the $(N-1)^{st}$ round and before the SubBytes operation of the $(N)^{th}$ round. In some embodiments, a random delay is introduced during an execution of the AES algorithm to minimize a probability of a successful DFA attack. In some embodiments, the random delay is introduced after completion of the $(N-1)^{st}$ round and before repeating the $(N-1)^{st}$ round. In some embodiments, the SubBytes operation and the ShiftRows operation are executed in a different order during at least one of the rounds to minimize a probability of a successful DFA attack. In some embodiments, a dummy round is executed is introduced between completion of the $(N-1)^{st}$ round and completion of the repeated $(N-1)^{st}$ round to minimize a probability of a successful DFA attack.

According to another embodiment, an integrated circuit for performing an AES encryption algorithm having N rounds and for detecting a DFA attack is disclosed. The integrated circuit comprises an integrated round circuit, wherein a round is defined as a time during which operations within the integrated round circuit are executed once, wherein the integrated round circuit comprises: a SubBytes circuit, a ShiftRows circuit, a MixColumns circuit, an adder, an input multiplexer and an adder multiplexer; wherein the SubBytes circuit and the ShiftRows circuit are performed sequentially before the MixColumns circuit; the adder is performed after the MixColumns circuit; the input multiplexer is used to select with an output of the adder or plaintext data; and the adder multiplexer is used to bypass the MixColumns circuit during a last round; at least one latch to hold interim data and results; a recheck multiplexer, having an output of one of the at least one latch as an input; a comparator to compare an output of one of the at least one latch to another value; and a controller, wherein the controller configures the integrated circuit to: perform a first (N−2) rounds; save the interim data after completion of the MixColumns circuit in the $(N-2)^{nd}$ round in one of the at least one latch; perform at least a portion of a $(N-1)^{st}$ round; save the results after completion of the MixColumns circuit in the $(N-1)^{st}$ round in one of the at least one latch; repeat a portion of the AES encryption algorithm using the interim data wherein the portion of the AES encryption algorithm that is repeated comprises all operations starting after the interim data was saved and ending with the operation after which the results were stored; compare an output of the repeated portion of the AES encryption algorithm with the saved results; and flag an error if the output of the repeated portion of the AES encryption algorithm (and the saved results do not match. In some embodiments, the interim data is saved after the MixColumns circuit and before the adder of the $(N-2)^{nd}$ round. In some embodiments, the interim data is saved after the adder of the $(N-2)^{nd}$ round and before the $(N-1)^{st}$ round. In some embodiments, the results saved after the MixColumns circuit and before the adder of the $(N-1)^{st}$ round. In some embodiments, the results are saved after the adder of the $(N-1)^{st}$ round and before the $(N)^{th}$ round. In some embodiments, a random delay is introduced by the controller during an execution of the AES encryption algorithm to minimize a probability of a successful DFA attack. In certain embodiments, the random delay is introduced after completion of the $(N-1)^{st}$ round and before repeating the $(N-1)^{st}$ round. In some embodiments, the SubBytes circuit and the ShiftRows circuit are executed in a different order during at least one of the rounds to minimize a probability of a successful DFA attack. In some embodiments, a dummy round is executed is introduced between completion of the $(N-1)^{st}$ round and completion of the repeated $(N-1)^{st}$ round to minimize a probability of a successful DFA attack. In certain embodiments, the at least one latch comprises two latches; a holding latch and a results latch, wherein interim data is stored in the holding latch and results are stored in the results latch.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, differential fault analysis (DFA) can be used to try to determine the initialization vector (IV) key. Studies have shown that, if interim results are not visible, the approach that is most likely to succeed is initiated by introducing a fault after the MixColumns circuit 13 in the second from last round (N−2) and before the final MixColumns circuit 13, which occurs in the next to last round (N−1). This is because a fault that is introduced during this time interval result in an output that differs from the correct output by 4 bytes, rather than all bytes. Further, in situations when the interim results are not visible, faults introduced in early rounds are not effective in determining the IV key. Thus, in certain situations, it may not be necessary to detect if a DFA attack is being executed, only whether that DFA attack has a chance of being successful. In other words, faults that are inserted in the early rounds may result in an incorrect output, but that incorrect output cannot trivially be used to determine the IV key.

The present disclosure takes advantage of these observations to create a system and method that can be used to detect whether a DFA attack is being executed during an interval when it has the best chance of being successful. Specifically, referring to FIGS. 1 and 3, if a fault is introduced after the second to last MixColumns circuit 13, the data with that fault will undergo the following set of operations: Adder (round N−2); SubBytes (round N−1); Shift Bytes (Round N−1), MixColumns (Round N−1); Adder (Round N−1; SubBytes (Round N); ShiftRows (Round N); and Adder (Round N). Note that all of these operations, except MixColumns (Round N−1), are all byte operations, such that the fault is not propagated to any other byte. The MixColumns operation causes a single bit fault to propagate to exactly 4 bytes (all of the bytes in that column). Since only 4 bytes of the output are affected, such a DFA attack has the highest probability of success. Thus, to protect against this specific type of DFA attack, the system must check whether the data was affected during this interval. Such a system requires far less power and real estate to achieve this result than currently proposed systems.

Figure 1:
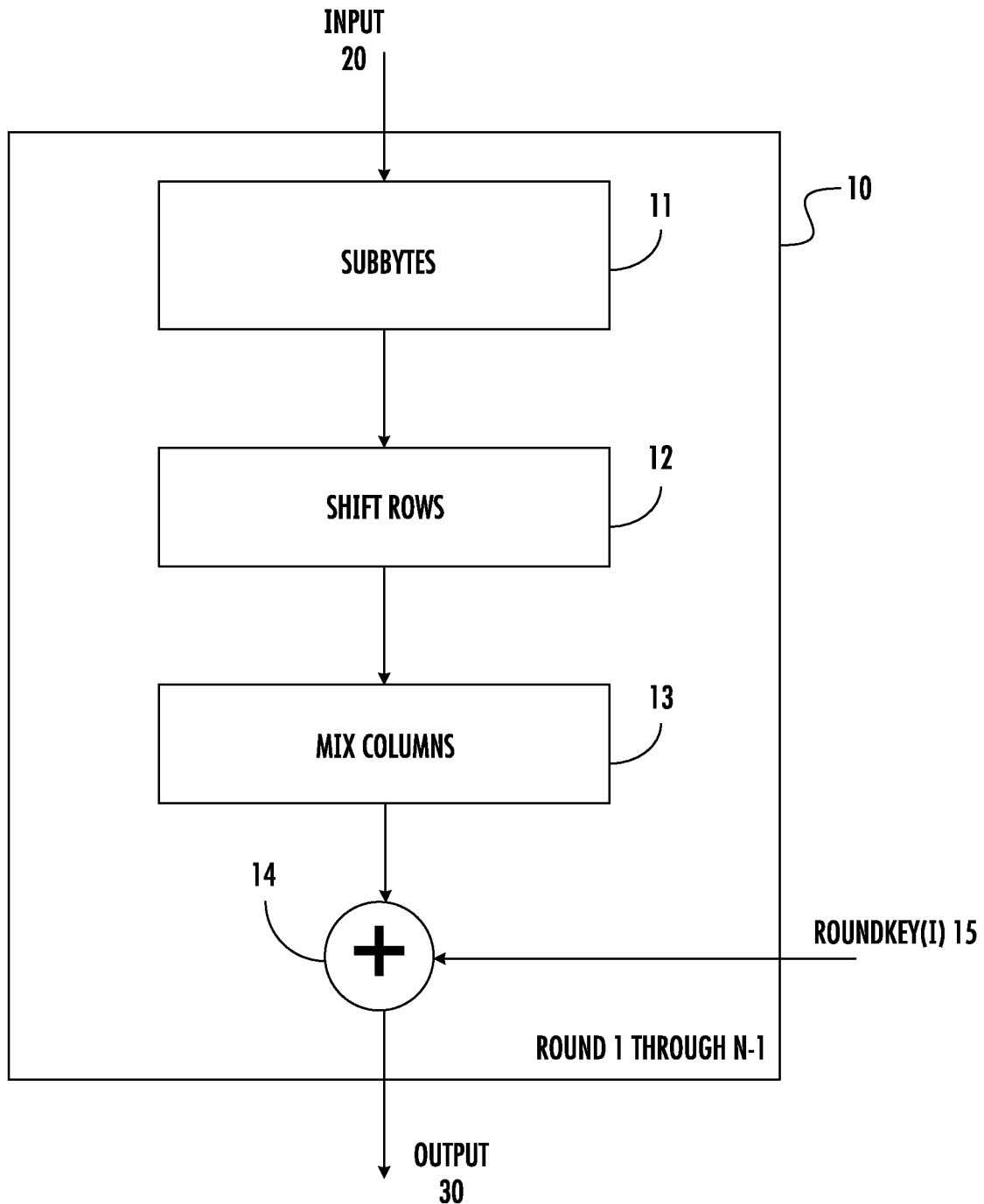
FIG. 1 shows the circuitry used to implement a round of an AES algorithm according to one embodiment.
Figure 2:
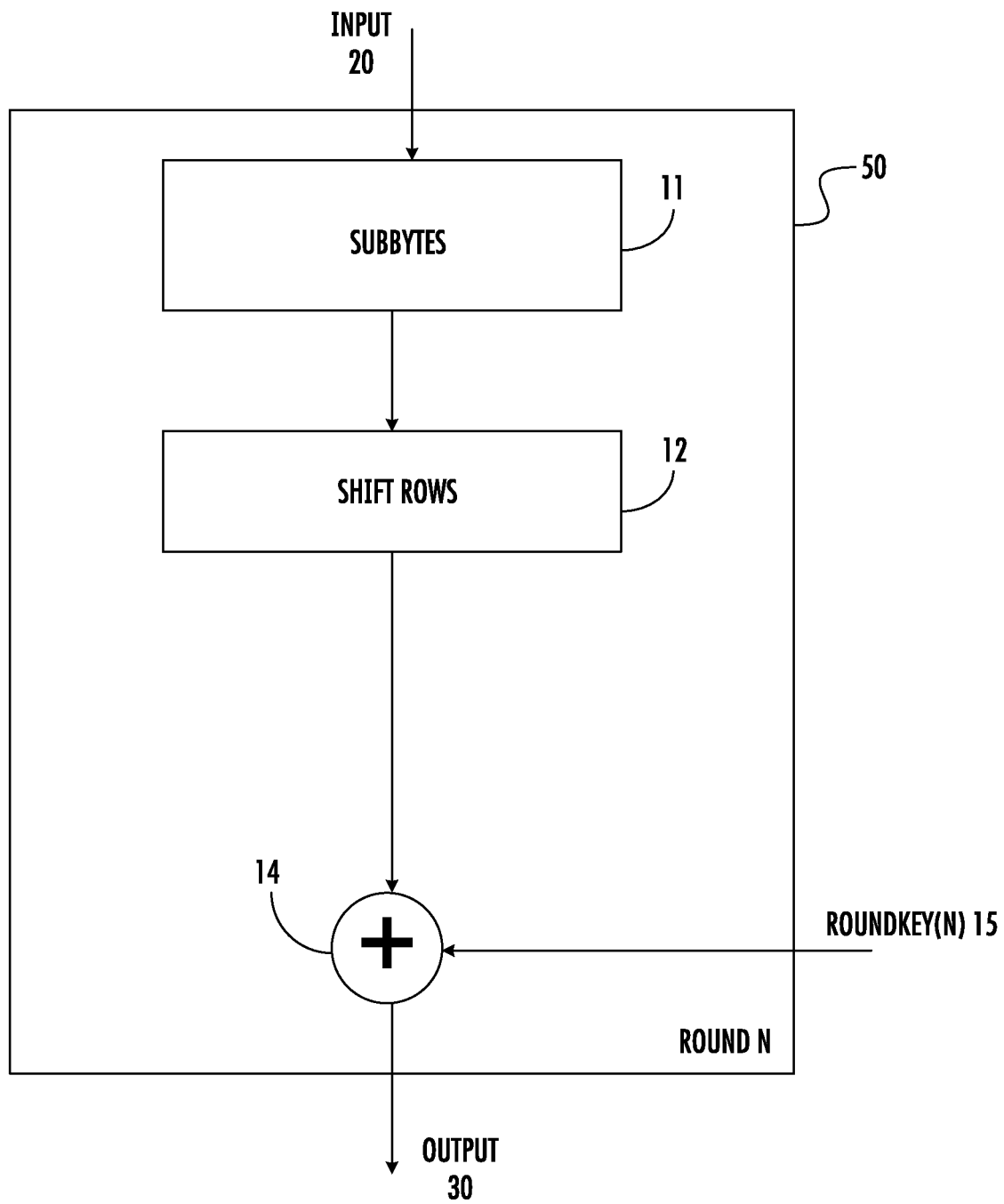
FIG. 2 shows the circuitry used to implement the final round of an AES algorithm according to one embodiment.
Figure 4:
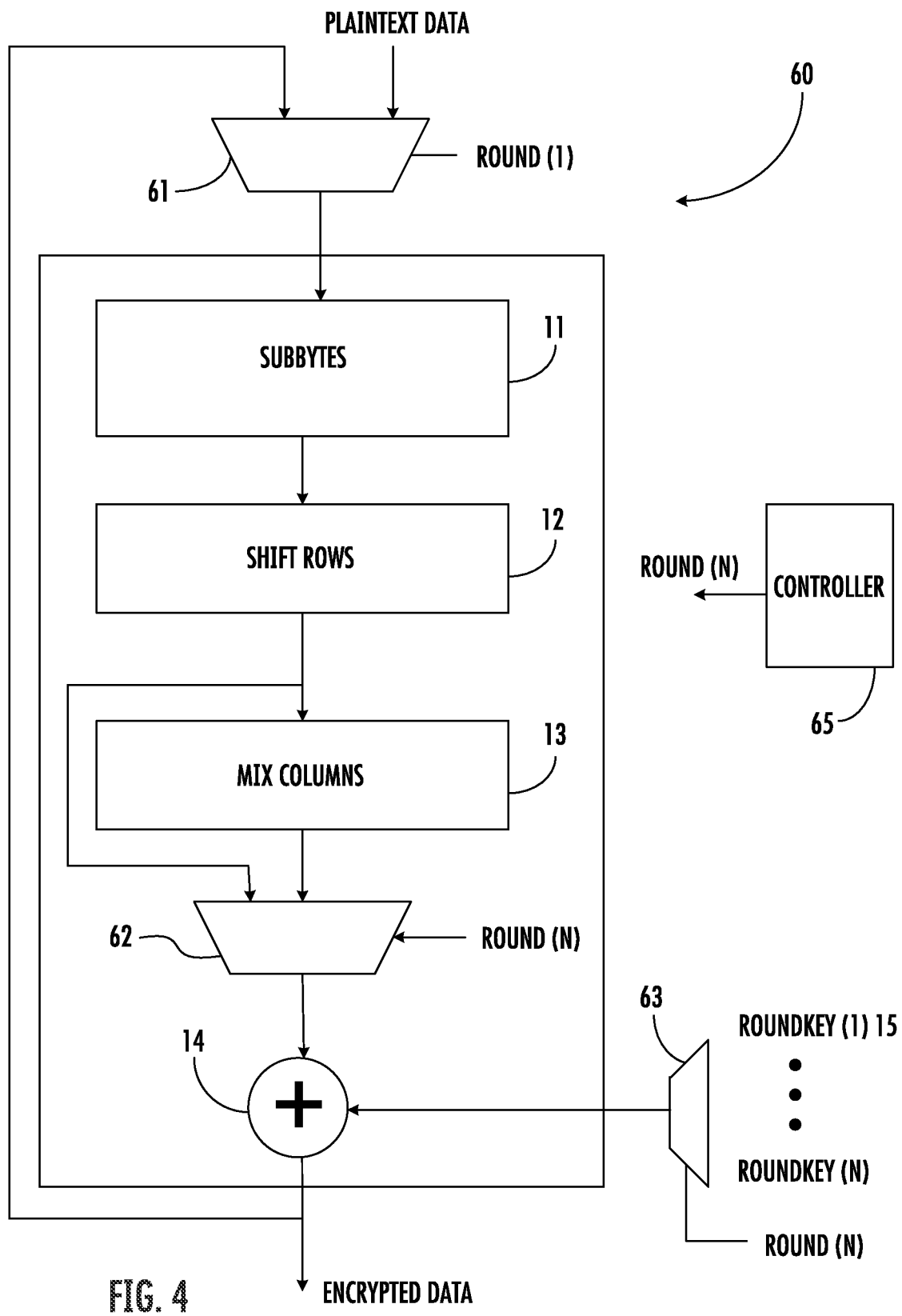
FIG. 4 is a block diagram of an integrated round circuit that can be used a plurality of times to implement the AES algorithm and generate the encrypted data.
Figure 5:
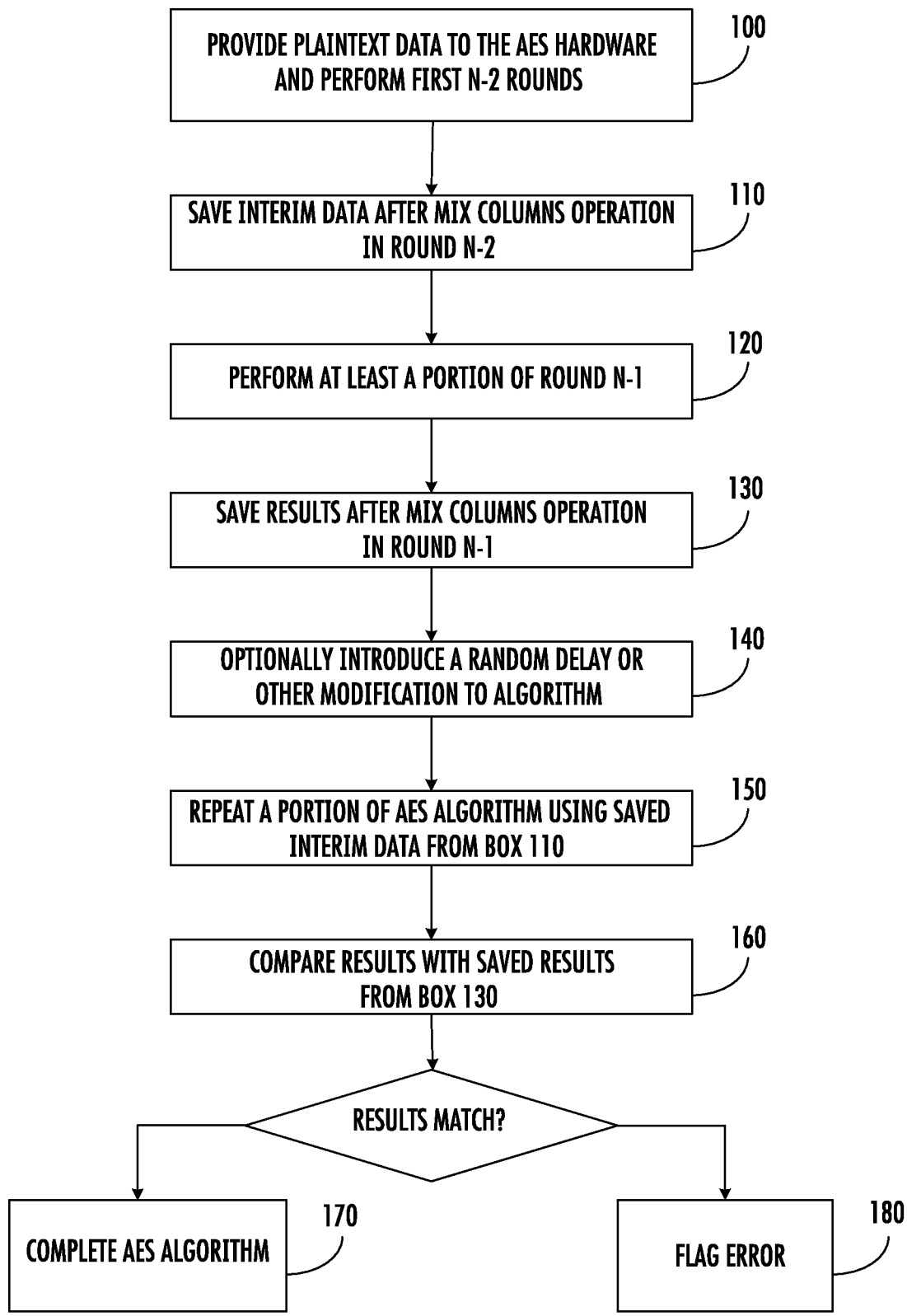
FIG. 5 shows a flowchart showing the operation of the new AES algorithm.

FIG. 5 shows a flow chart of the system and method described herein. This flow chart can be used with the embodiments shown in FIG. 3 and FIG. 4. First, as shown in Box 100, plaintext data is provided to the AES algorithm and the first N−2 rounds of the AES algorithm are performed. Interim data, which is generated some time after the MixColumns operation in Round N−2, is saved, as shown in Box 110. FIG. 5 shows that the interim data is saved some time after the MixColumns operation. In certain embodiments, the interim data is saved after the last operation in which an injected fault would result in all bytes of the output being affected. For example, in the example shown above, a fault introduced prior to the MixColumns operation in the second to last round would result in all 16 bytes of the output being affected, since two MixColumns operations are performed after the fault is injected. Alternatively, the interim data may be saved at a later point in time. Thus, in certain embodiments, the interim data is saved immediately after the MixColumns operation in Round N−2, or after the adder operation in Round N−2. If the operations shown in FIG. 1 are performed in a different order, the location at which the interim data is saved may be different.

After the interim data has been saved, at least a portion of the Round N−1 (i.e. the next to last round) is executed, as shown in Box 120. The results after the MixColumns operation in Round N−1 are then saved, as shown in Box 130. Again, this may be immediately after the MixColumns operation in Round N−1, or after the adder operation in Round N−1. In certain embodiments, the results can be saved as early as after the last operation that injects a single byte fault that propagates to exactly 4 bytes in the output. In other embodiments, the results can be saved as late as after the end of the AES algorithm, although this would require more rounds to be repeated.

In certain embodiments, a random delay or another modification to the algorithm may be introduced, as shown in Box 140. The purpose of this delay or modification will be described below. While the delay is shown as occurring after the results are stored, it is understood that the delay may be introduced at any point in the execution of the algorithm.

As shown in Box 150, a portion of the AES algorithm is repeated, using the interim data that was saved in Box 110. In other words, all of the operations starting after the interim data was saved and ending with the operation after which the results were stored, are repeated. In certain embodiments, the round (N−1) is repeated. In other embodiments, the adder operation from Round (N−2), the SubBytes operation from Round (N−1), the ShiftRows operation from Round (N−1), and the MixColumns operation from Round (N−1) are repeated.

As shown in Box 160, the results from this repeated sequence of operations are then compared to the results that were saved in Box 130. If these results match, the AES operation continues, as shown in Box 170. However, if the results differ, an error is flagged as shown in Box 180.

The flagging of the error may result in various actions. In one embodiment, the device may reset itself. In another embodiment, the error may be passed to a processing unit that determines an appropriate action. In another embodiment, the device restarts the AES operation and discards all of the saved data.

Having described the concept used to detect a potentially successful DFA attack, several embodiments of the AES hardware will be disclosed. The operations and components described herein are part of an integrated circuit disposed within a semiconductor device and are created using transistors. Further, the latches described herein may be flip-flops or may be a location disposed in a memory storage device. Finally, the controller may be constructed as a state machine, a dedicated processing unit or a general purpose processing unit.

Figure 3:
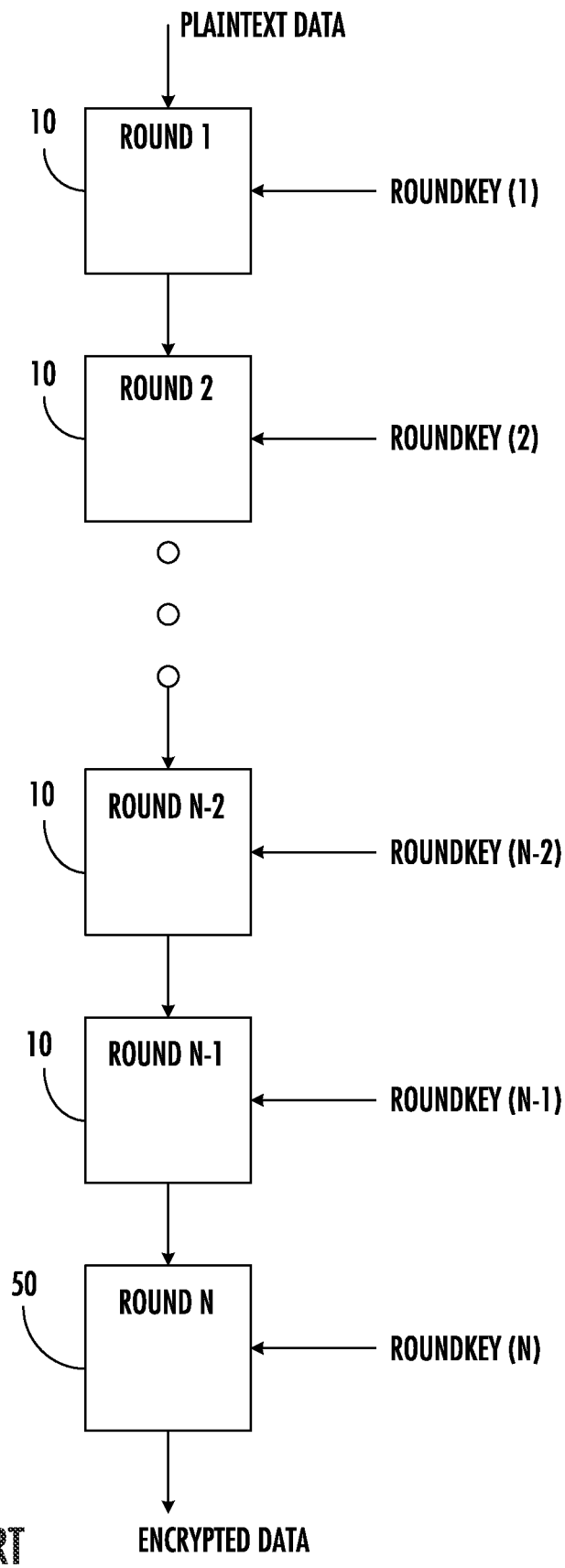
FIG. 3 is a block diagram of the AES circuitry using a plurality of round circuits and a final round circuit.
Figure 6:
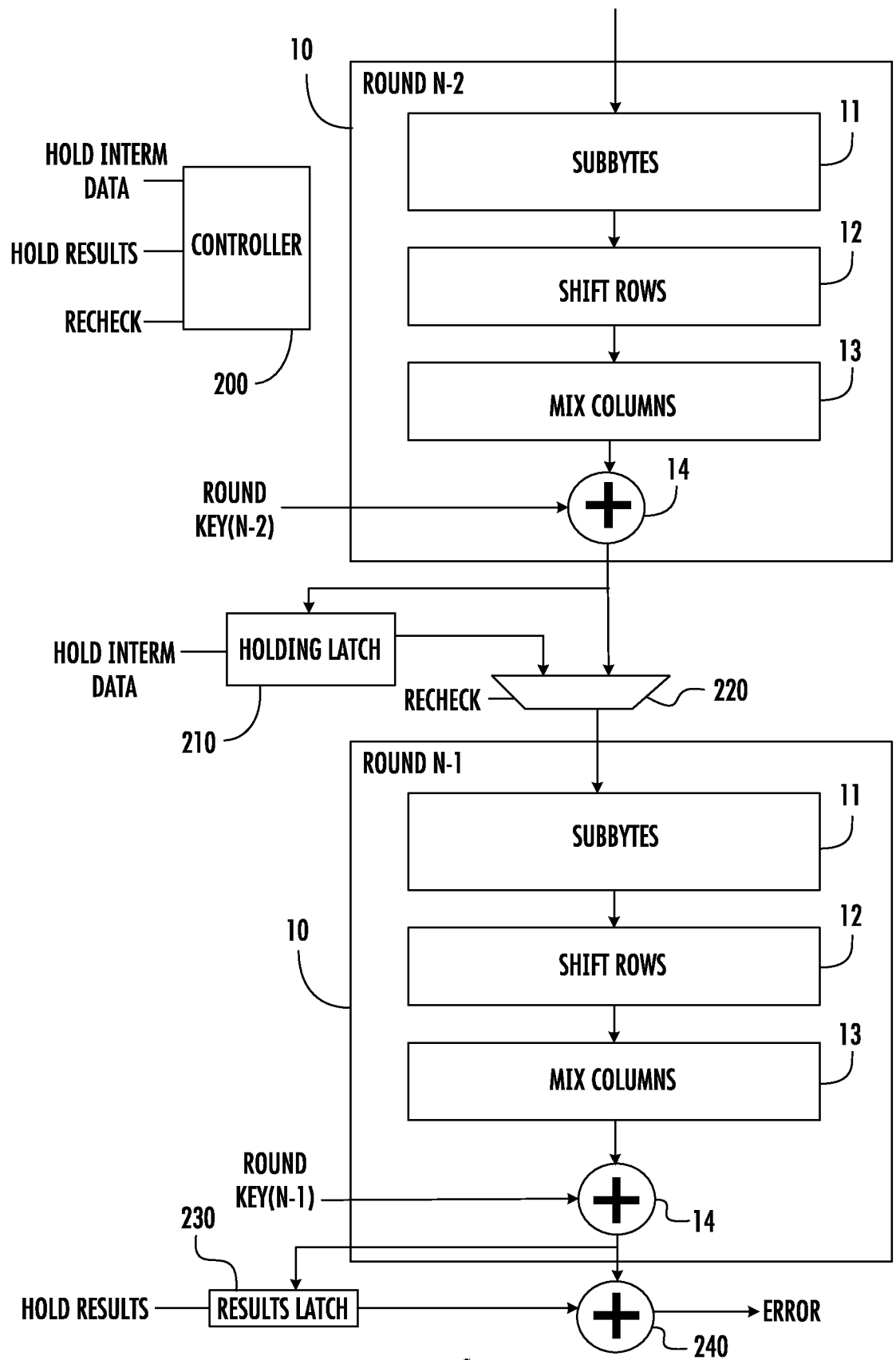
FIG. 6 shows a modified version of FIG. 3 that incorporates the check for vulnerability according to one embodiment.

FIG. 6 is an embodiment that are based on FIG. 3, while FIGS. 7A-7D are embodiments that are based on FIG. 4.

In FIG. 6, those components with the same function as those in FIG. 3 have been given identical reference designators and will not be described again.

In this embodiment, the round circuit 10 is unchanged; it contains the SubBytes circuit 11, the ShiftRows circuit 12, the MixColumns circuit 13 and the adder 14. Further, the final round circuit 50 is also unchanged; and contains the SubBytes circuit 11, the ShiftRows circuit 12 and the adder 14.

A controller 200 is used to monitor the activity of the AES hardware and to implement the sequence shown in FIG. 5. Specifically, the controller 200 asserts a first control signal, Hold Interim Data, to allow the output from round (N−2) circuit to be saved in holding latch 210. The holding latch 210 is 128 bits wide, which is the dimension needed to hold the 4×4 array. The AES hardware continues by using the output from the Round (N−2) circuit as the input to the round (N−1) circuit by properly configuring the recheck multiplexer 220. The recheck multiplexer 220 is also 128 bits wide. After the round (N−1) circuit completes its operation, the controller 200 asserts a second control signal, Hold Results, to allow the output from round (N−1) circuit to be saved in results latch 230. The results latch 230 is also 128 bits wide, which is the dimension needed to hold the 4×4 array.

The controller 200 then asserts a third control signal, Recheck, which configures the recheck multiplexer 220 to allow the stored interim data from the holding latch 210 to be provided as the input to the round (N−1) circuit. The round (N−1) circuit then executes its sequence of operations. The output of the round (N−1) circuit is then compared to the saved results in the results latch 230 using comparator 240. The comparator 240 compares two 128 bit values. If these values differ, an error is flagged.

Note that this approach added two latches, holding latch 210 and results latch 230, a recheck multiplexer 220 and one comparator 240. Further, this approach utilized one round circuit twice. Thus, for AES-128, which utilizes 10 rounds, the use of one round circuit twice increases the execution time of the AES hardware by 10%. For AES-192 and AES-256, this increase in execution time is even smaller. Further, this approach detects DFA attacks that may likely be successful. Thus, this approach represents an optimal combination of DFA detection, power consumption, real estate, and execution time.

Note that while the inputs to holding latch 210 and the results latch 230 are in communication with the output of the adder 14, other embodiments are also possible. For example, the input to the holding latch 210 may be in communication with the output from the MixColumns circuit 13 in Round (N−2). Likewise, the input to the results latch 230 may be in communication with the output from the MixColumns circuit 13 in Round (N−1). In other embodiments, the input to the results latch 230 may in communication with the output of a circuit in the Round (N).

In many embodiments, the AES hardware is configured like that shown in FIG. 4, as this approach utilizes far less circuitry. The approach described above is equally applicable to this configuration.

Figure 7A:
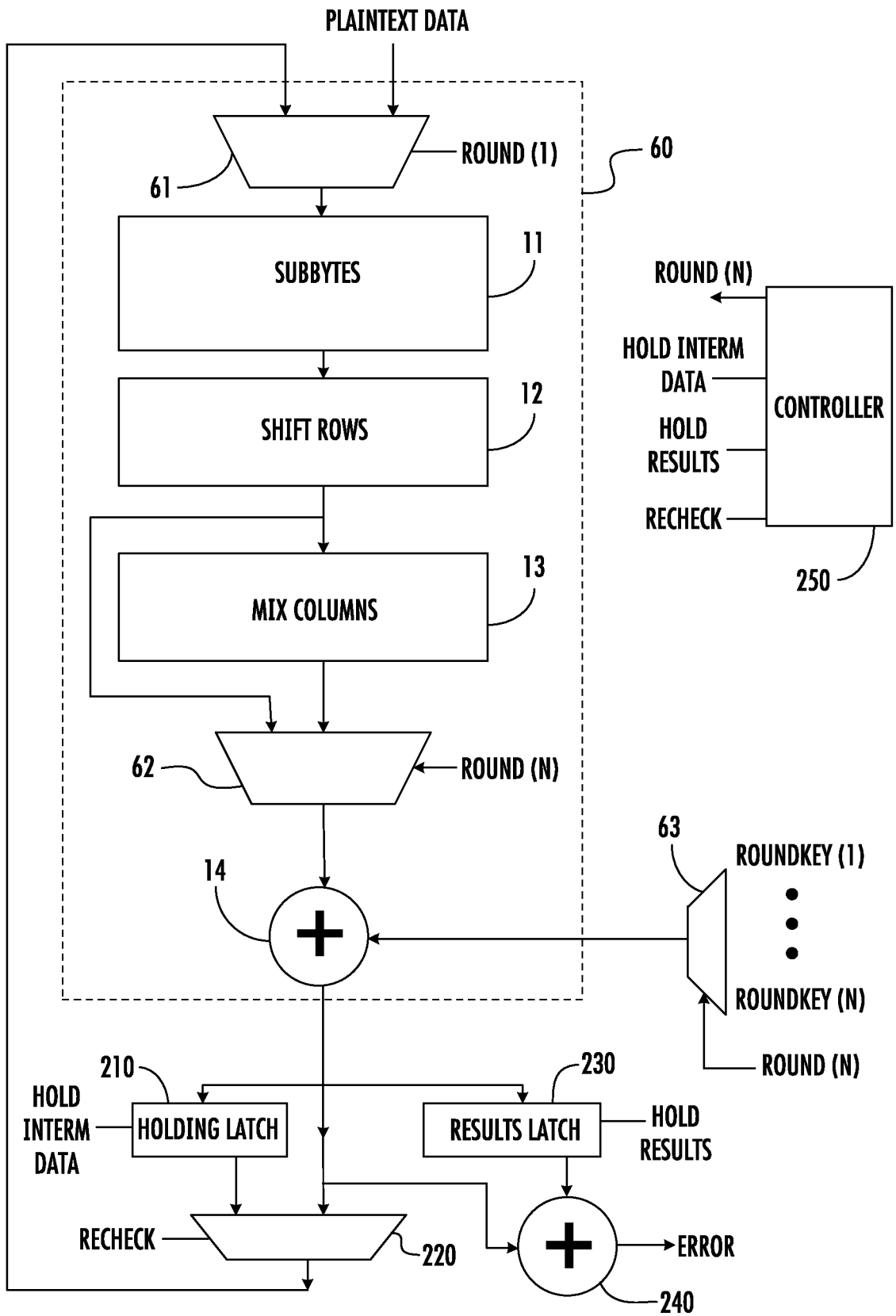
FIG. 7A shows a modified version of FIG. 4 that incorporates the check for vulnerability according to one embodiment.

FIG. 7A shows a first embodiment that utilizes an integrated round circuit. This embodiment combines the integrated round circuit 60 from FIG. 4 with the new components that were introduced in FIG. 6. Components with the same function as previously described have been given identical reference designators.

The recheck multiplexer 220 has been added between the output of the adder 14 and the input multiplexer 61. This recheck multiplexer 220 is used to select either the output of the adder 14, which is the normal case, or the output from the holding latch 210.

Additionally, the holding latch 210 is included. The input to the holding latch 210 is the output from the adder 14, while the output from the holding latch 210 is in communication with the recheck multiplexer 220.

A results latch 230 is also included. The input to the results latch 230 is also the output from the adder 14, while the output from the results latch 230 is in communication with the comparator 240.

Finally, a comparator 240 is used to compare the output from the adder 14 and the output from the results latch 230 and provide an error indication if these outputs do not match.

The AES hardware also includes a controller 250 that supplies a plurality of outputs. As described in FIG. 3, there are one or more outputs that indicate the round that is being performed. Further, as described in FIG. 6, there is a first output, referred to as Hold Interim Data, that is used to hold the interim data after the completion of the $(N-2)^{nd}$ round. There is a second output, referred to as Hold Results, that is used to hold the results after completion of the $(N-1)^{st}$ round. There is a third output, referred to as Recheck, this indicates that the $(N-2)^{nd}$ round is being repeated.

In operation, the controller 250 begins by asserting a round value of 1, indicating that this is the first round. This cases the input multiplexer 61 to select the plaintext data as the input to the SubBytes circuit 11. The rest of the round is then executed, which includes the SubBytes circuit 11, the ShiftRows circuit 12, the MixColumns circuit 13 and the adder 14. Following completion of the first round, the controller updates the round value to a value of 2, indicating that the second round is being executed. This causes the input multiplexer 61 to select the output from the adder 14 as the input to the SubBytes circuit 11. The second round is then executed as described above.

This process continues until the $(N-2)^{nd}$ round, where N is 10 for AES-128, 12 for AES-192 and 14 for AES-256. After completion of the $(N-2)^{nd}$ round, the controller 250 asserts the Hold Interim Data control signal, which causes the output of the adder 14 to be stored in the holding latch 210.

The controller 250 then continues by changing the round value to a value of N−1. The $(N-1)^{st}$ round is then executed. At the completion of the $(N-1)^{st}$ round, the controller 250 asserts the Hold Results control signal, which causes the output of the adder 14 to be stored in the results latch 230. The controller 250 then keeps the round value at (N−1) and asserts the Recheck control signal. This causes the output from the holding latch 210 (which is the output from the $(N-2)^{nd}$ round) to be used as the input to the SubBytes circuit 11. Further, since the round value is still (N−1), the adder 14 uses the round key associated with the $(N-1)^{st}$ round. In other words, the (N−1) stage is repeated. Importantly, the same physical hardware is used for both the original $(N-1)^{st}$ round and the repeated $(N-1)^{st}$ round. The output from the adder 14 is then compared to the contents of the results latch 230. If these results match, the controller 250 updates the round value to a value of (N) and completes the final round of the AES algorithm. If the results do not match, an error is flagged.

This approach adds one or two latches, a multiplexer, and a comparator. Additionally, the controller shown in FIG. 4 is modified. In other words, the increase in the number of transistors is minimal. Further, as described above, the execution time is increased by 10% or less, since only one round is repeated.

Figure 7B:
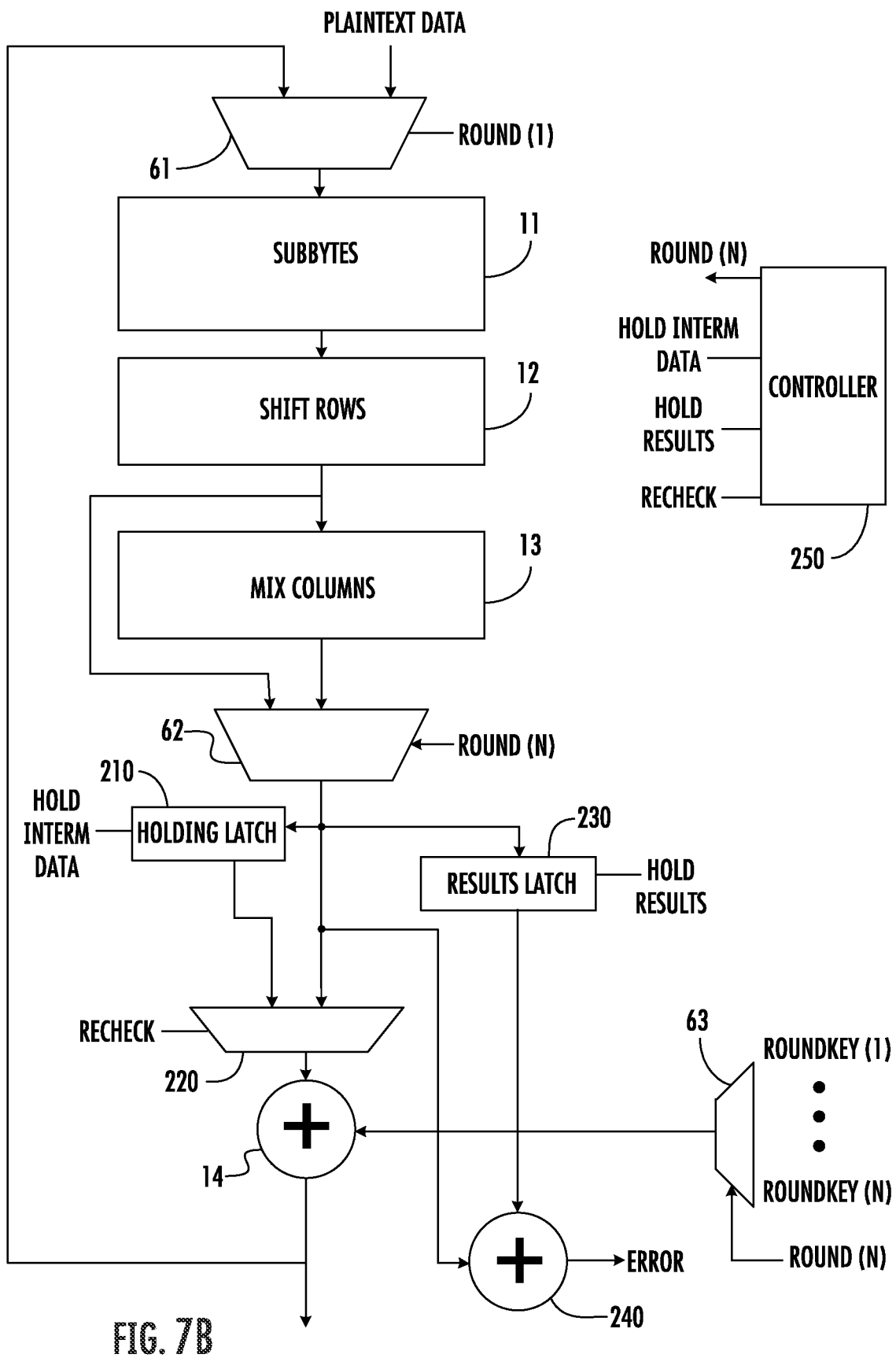
FIG. 7B shows a modified version of FIG. 4 that incorporates the check for vulnerability according to another embodiment.

FIG. 7A shows one embodiment where the results are latched after completion of the $(N-2)^{nd}$ and $(N-1)^{st}$ rounds. However, as described above, the interim data and results may be collected at other points in the execution of the AES algorithm. FIG. 7B shows another embodiment. In this embodiment, the holding latch 210, the results latch 230, and the recheck multiplexer have been deployed between the MixColumns circuit 13 and the adder 14, rather than after the adder 14, as shown in FIG. 7A. The rest of the hardware is as described above. Further, the controller 250 operates in the same manner as described above.

Figure 7C:
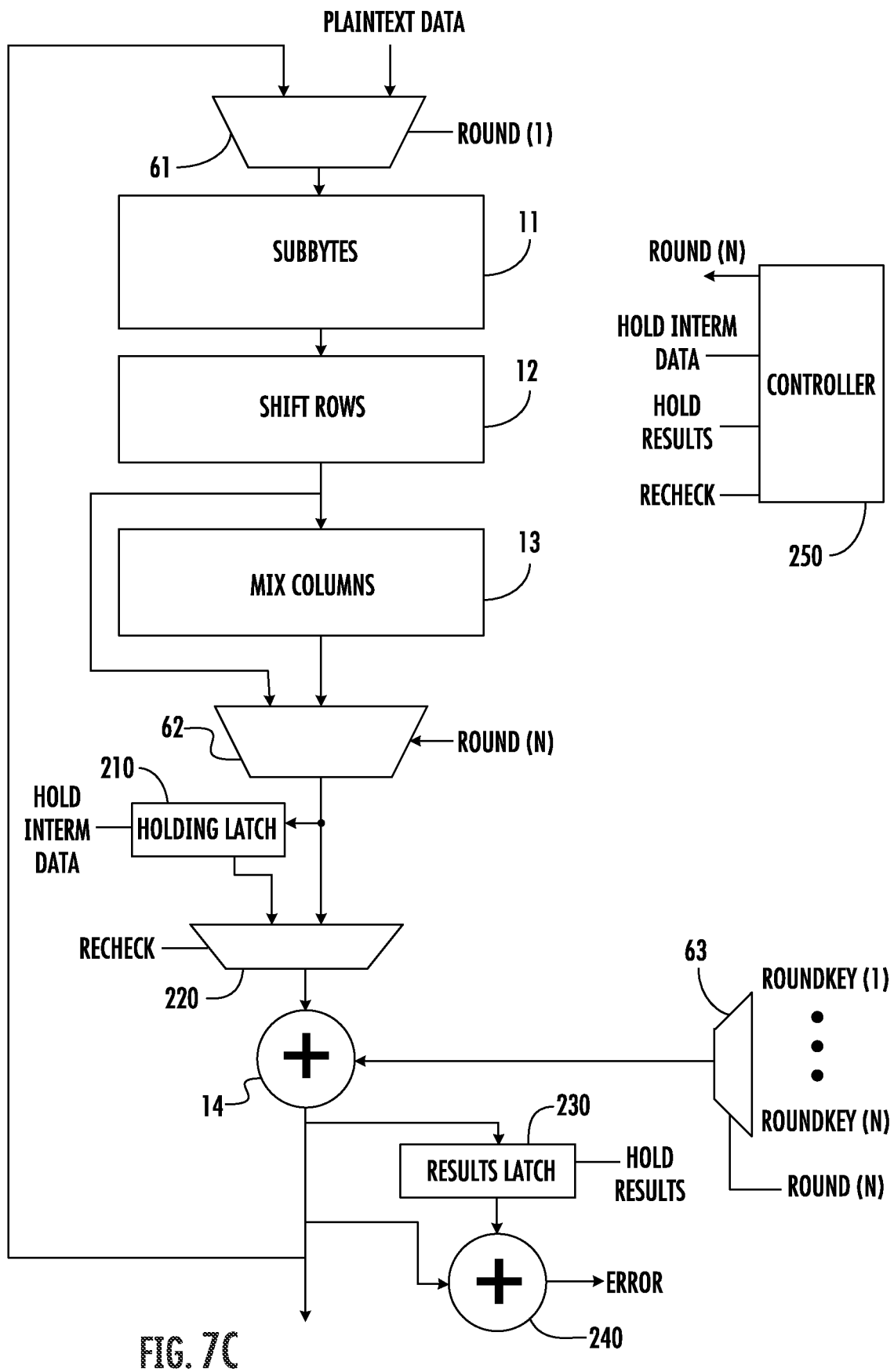
FIG. 7C shows a modified version of FIG. 4 that incorporates the check for vulnerability according to another embodiment.

FIGS. 7A-7B show the interim data and the result being stored at the same location in the integrated round circuit. However, other embodiments are also possible. FIG. 7C shows the interim data being saved immediately after the MixColumns circuit 13 and the results being saved and compared after the adder 14. Similarly, the interim data may be saved after the adder 14, while the results are saved and compared after the MixColumns circuit 13. Additionally, the results may be saved after other circuits.

Figure 7D:
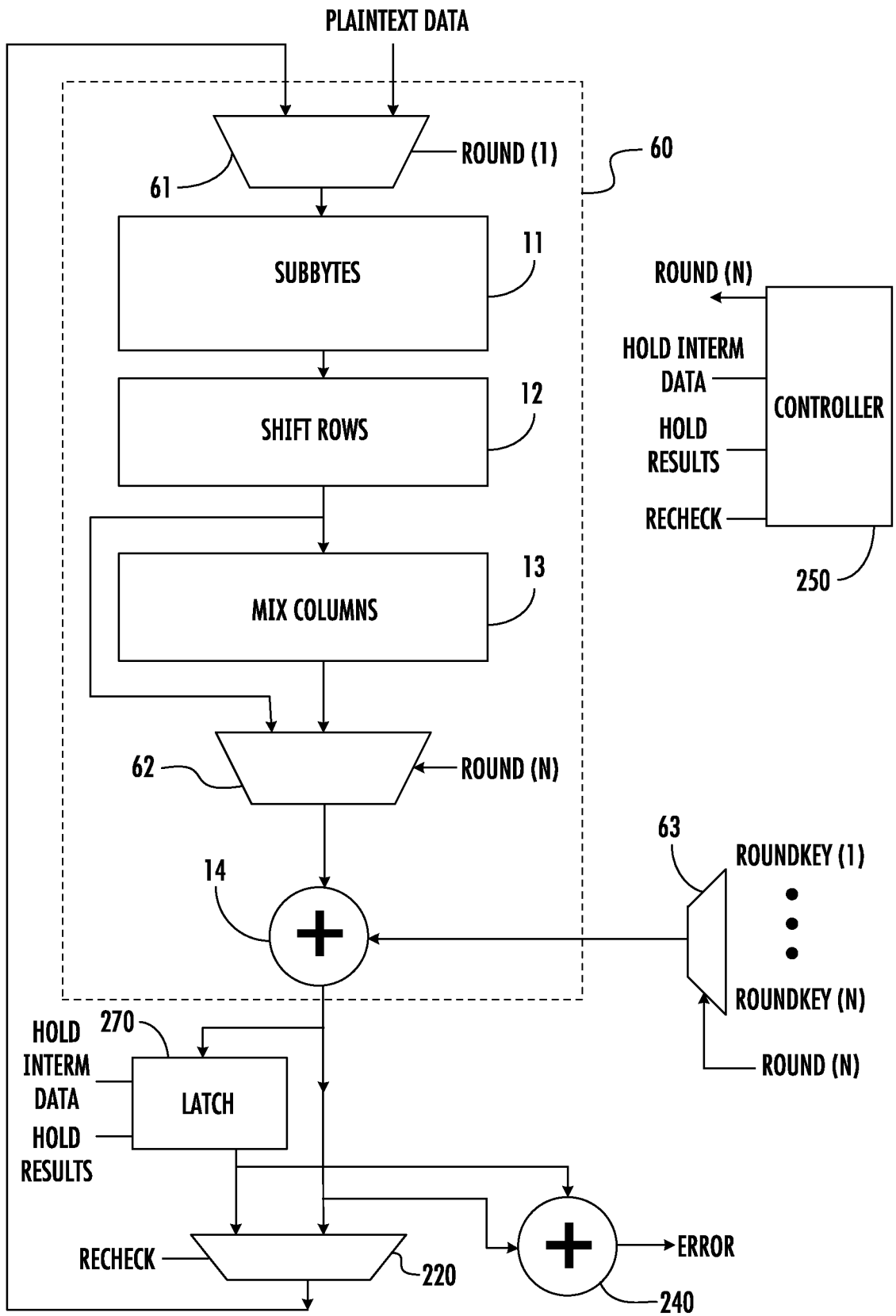
FIG. 7D shows a modified version of FIG. 4 that incorporates the check for vulnerability according to another embodiment.

FIGS. 7A-7C show the holding latch 210 and the results latch 230 are being different components. However, in certain embodiments, these latches may be the same physical device. For example, as shown in FIG. 7D, the interim data from the latch 270 may be clocked into the SubBytes circuit 11 at the same time that the results are being clocked into the latch 270. Thus, the latch 270 is used to store data twice during the execution of the AES algorithm; first to store the interim data and then to store the results. In this embodiment, the output from the latch 270 is used to provide the interim data to the recheck multiplexer 220 and also to provide the results to the comparator 240. Note that while FIG. 7D shows the input to the latch 270 in communication with the output of the adder 14, other embodiments are also possible. For example, the input to the latch 270 may be in communication with the output of the adder multiplexer 62, similar to the configuration shown in FIG. 7B. In this embodiment, the output of the recheck multiplexer 220 is in communication with the input to the adder 14. Alternatively, the input to the latch 270 may be in communication with the output of the MixColumns circuit 13. In this embodiment, the output of the recheck multiplexer 220 is in communication with the input to the adder multiplexer 62.

The above embodiments may be successful in determining when a DFA attack has occurred after the MixColumns operation in the $(N-2)^{nd}$ round and before the MixColumns operation in the $(N-1)^{st}$ round. In almost all cases, this approach would be successful in detect such an attack. However, if the bad actor is able to inject the same error in exactly the same point in this sequence twice, the embodiments shown in FIG. 6-7 may not detect such an attack.

Therefore, in certain embodiments, further countermeasures are undertaken. These countermeasures were referred to in Box 140 of FIG. 5. Specifically, a bad actor may measure the time taken to complete the AES algorithm in the semiconductor device. Based on that, the bad actor may be able to determine the time needed for each round and exactly when the $(N-2)^{nd}$ and $(N-1)^{st}$ rounds are being executed. To counteract this, the controller 250 may introduce a random delay in the AES algorithm. In some embodiments, this delay may be introduced between the first time that the $(N-1)^{st}$ round is completed, and the second time that the $(N-1)^{st}$ round is completed. This may be done by introducing the delay between the end of the first $(N-1)^{st}$ round and the start of the second $(N-1)^{st}$ round. In other embodiments, the delay may be introduced between two operations within the $(N-1)^{st}$ round. In another embodiment, a "dummy" round may be performed, wherein the results are not captured or used at a later time. For example, after the interim data is stored, the controller may perform one or more dummy rounds, where the data is not stored. After the dummy round has been completed, the controller 250 may assert the recheck control signal t allow the output of the holding latch 210 to be used Alternatively, a modification may be made to the AES algorithm to minimize the chances of a second fault at exactly the same point in the AES algorithm. For example, in one embodiment, the modification may comprise switching the order of execution of the SubBytes operation and the ShiftRows operation in at least one of the rounds. Another modification may be to add a certain value to each number in the array before a round or operation within a round and then subtracting this value after the round or operation.

The present system and method have many advantages. The AES hardware in the present disclosure identifies when a DFA attack, which has the possibility of successfully determining the IV key, is detected. To perform this detection, the present system only requires one or two latches, a multiplexer, a comparator and some control logic.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for detecting a Differential Fault Analysis (DFA) attack when executing an AES algorithm, wherein the AES algorithm requires execution of N rounds, each of a first (N−1) rounds comprising a SubBytes operation, a ShiftRows operation, a MixColumns operation and an adder operation, and wherein a last round comprises the SubBytes operation, the ShiftRows operation and the adder operation, the method comprising:
    providing plaintext data to the AES algorithm;
    performing a first (N−2) rounds;
    saving interim data after completion of the MixColumns operation in the $(N-2)^{nd}$ round;
    performing at least a portion of a $(N-1)^{st}$ round;
    saving results after completion of the MixColumns operation in the $(N-1)^{st}$ round;
    repeating a portion of the AES algorithm using the interim data, using a same circuit as was used to perform the at least a portion of the $(N-1)^{st}$ round, wherein the portion of the AES algorithm that is repeated comprises all operations starting after the interim data was saved and ending with an operation after which the results were stored;
    comparing an output of the repeated portion of the AES algorithm with the saved results; and
    flagging an error if the output of the repeated portion of the AES algorithm and the saved results do not match.

2. The method of claim 1, wherein the interim data is saved after a last operation in which an injected fault would result in all bytes of the output being affected.

3. The method of claim 2, wherein the interim data is saved after the MixColumns operation and before the adder operation of the $(N-2)^{nd}$ round.

4. The method of claim 2, wherein the interim data is saved after the adder operation of the $(N-2)^{nd}$ round and before the SubBytes operation of the $(N-1)^{st}$ round.

5. The method of claim 1, wherein the results saved after the MixColumns operation and before the adder operation of the $(N-1)^{st}$ round.

6. The method of claim 1, wherein the results are saved after the adder operation of the $(N-1)^{st}$ round and before the SubBytes operation of the $(N)^{th}$ round.

7. The method of claim 1, wherein a random delay is introduced during an execution of the AES algorithm to minimize a probability of a successful DFA attack.

8. The method of claim 7, wherein the random delay is introduced after completion of the $(N-1)^{st}$ round and before repeating the $(N-1)^{st}$ round.

9. The method of claim 1, wherein the SubBytes operation and the ShiftRows operation are executed in a different order during at least one of the rounds to minimize a probability of a successful DFA attack.

10. The method of claim 1, wherein a dummy round is executed is introduced between completion of the $(N-1)^{st}$ round and completion of the repeated $(N-1)^{st}$ round to minimize a probability of a successful DFA attack.

11. An integrated circuit for performing an AES encryption algorithm having N rounds and for detecting a DFA attack, comprising:
    an integrated round circuit, wherein a round is defined as a time during which operations within the integrated round circuit are executed once, wherein the integrated round circuit comprises:
        a SubBytes circuit, a ShiftRows circuit, a MixColumns circuit, an adder, an input multiplexer and an adder multiplexer; wherein the SubBytes circuit and the ShiftRows circuit are performed sequentially before the MixColumns circuit; the adder is performed after the MixColumns circuit; the input multiplexer is used to select with an output of the adder or plaintext data; and the adder multiplexer is used to bypass the MixColumns circuit during a last round;
    at least one latch to hold interim data and results;
    a recheck multiplexer, having an output of one of the at least one latch as an input;
    a comparator to compare an output of one of the at least one latch to another value; and
    a controller, wherein the controller configures the integrated circuit to:
        perform a first (N−2) rounds;
        save the interim data after completion of the MixColumns circuit in the $(N-2)^{nd}$ round in one of the at least one latch;
        perform at least a portion of a $(N-1)^{st}$ round;
        save the results after completion of the MixColumns circuit in the $(N-1)^{st}$ round in one of the at least one latch;
        repeat a portion of the AES encryption algorithm using the interim data wherein the portion of the AES encryption algorithm that is repeated comprises all operations starting after the interim data was saved and ending with an operation after which the results were stored;
        compare an output of the repeated portion of the AES encryption algorithm with the saved results; and
        flag an error if the output of the repeated portion of the AES encryption algorithm (and the saved results do not match.

12. The integrated of claim 11, wherein the interim data is saved after the MixColumns circuit and before the adder of the $(N-2)^{nd}$ round.

13. The integrated circuit of claim 11, wherein the interim data is saved after the adder of the $(N-2)^{nd}$ round and before the $(N-1)^{st}$ round.

14. The integrated circuit of claim 11, wherein the results saved after the MixColumns circuit and before the adder of the $(N-1)^{st}$ round.

15. The integrated circuit of claim 11, wherein the results are saved after the adder of the $(N-1)^{st}$ round and before the $(N)^{th}$ round.

16. The integrated circuit of claim 11, wherein a random delay is introduced by the controller during an execution of the AES encryption algorithm to minimize a probability of a successful DFA attack.

17. The integrated circuit of claim 16, wherein the random delay is introduced after completion of the $(N-1)^{st}$ round and before repeating the $(N-1)^{st}$ round.

18. The integrated circuit of claim 11, wherein the SubBytes circuit and the ShiftRows circuit are executed in a different order during at least one of the rounds to minimize a probability of a successful DFA attack.

19. The integrated circuit of claim 11, wherein a dummy round is executed is introduced between completion of the $(N-1)^{st}$ round and completion of the repeated $(N-1)^{st}$ round to minimize a probability of a successful DFA attack.

20. The integrated circuit of claim 11, wherein the at least one latch comprises two latches; a holding latch and a results latch, wherein interim data is stored in the holding latch and results are stored in the results latch.

* * * * *